(12) United States Patent
Hunt et al.

(10) Patent No.: US 9,780,567 B2
(45) Date of Patent: Oct. 3, 2017

(54) ENERGY STORAGE SYSTEM

(71) Applicant: Cummins Power Generation IP, Inc., Minneapolis, MN (US)

(72) Inventors: Michelle Hunt, Minneapolis, MN (US); Elias M. Ayana, Minneapolis, MN (US); Bradford K. Palmer, Ham Lake, MN (US)

(73) Assignee: CUMMINS POWER GENERATION IP, INC., Minneapolis, MN (US)

( * ) Notice: Subject to any disclaimer, the term of this patent is extended or adjusted under 35 U.S.C. 154(b) by 243 days.

(21) Appl. No.: 14/626,190

(22) Filed: Feb. 19, 2015

(65) Prior Publication Data

US 2016/0248263 A1 Aug. 25, 2016

(51) Int. Cl.
*H02J 5/00* (2016.01)
*H02M 7/66* (2006.01)
*H02M 3/04* (2006.01)

(52) U.S. Cl.
CPC ...................................... *H02J 5/00* (2013.01)

(58) Field of Classification Search
CPC ...... H02J 9/06; H02J 4/00; H02J 9/00; H02M 7/515; H02M 5/45
USPC ....... 307/64, 66, 34, 23, 26; 363/137, 71, 96
See application file for complete search history.

(56) References Cited

U.S. PATENT DOCUMENTS

| | | | |
|---|---|---|---|
| 4,177,508 A * | 12/1979 | Schmid | ...................... H02J 3/26 363/37 |
| 4,367,522 A | 1/1983 | Forstbauer et al. | |
| 4,453,122 A | 6/1984 | Johnson et al. | |
| 4,475,506 A | 10/1984 | Riordan | |
| 5,548,504 A | 8/1996 | Takehara | |
| 5,557,249 A | 9/1996 | Reynal | |
| 5,563,802 A | 10/1996 | Plahn et al. | |
| 6,175,217 B1 * | 1/2001 | Da Ponte | ................ H02J 9/066 322/19 |

(Continued)

FOREIGN PATENT DOCUMENTS

| CN | 102291028 | 12/2011 |
|---|---|---|
| CN | 202586481 | 12/2012 |

(Continued)

OTHER PUBLICATIONS

International Search Report and Written Opinion for PCT/US2016/017951, Issued Apr. 22, 2016, 11 pages.

(Continued)

*Primary Examiner* — Jared Fureman
*Assistant Examiner* — Win Htun
(74) *Attorney, Agent, or Firm* — Foley & Lardner LLP

(57) ABSTRACT

Systems and methods for controlling power flow to and from an energy storage system are provided. One energy storage system includes an energy storage device and a bidirectional inverter configured to control a flow of power into or out of the energy storage device via a plurality of phases. The energy storage system further includes a controller configured to control the bidirectional inverter based on a load condition on one or more phases. The controller is configured to control the bidirectional inverter to store power generated by a generator set in the energy storage device and transmit power from the energy storage device to a load driven by the generator set in response to detecting a load imbalance between the phases.

26 Claims, 6 Drawing Sheets

(56) References Cited

U.S. PATENT DOCUMENTS

| | | | |
|---|---|---|---|
| 6,353,304 B1 | 3/2002 | Atcitty et al. | |
| 6,614,132 B2* | 9/2003 | Hockney | H02J 1/108 |
| | | | 307/43 |
| 6,862,199 B2* | 3/2005 | Escobar | H02J 3/01 |
| | | | 307/105 |
| 8,080,902 B2* | 12/2011 | Bright | H02J 3/38 |
| | | | 307/85 |
| 8,315,745 B2* | 11/2012 | Creed | H02J 3/14 |
| | | | 700/295 |
| 8,410,638 B2 | 4/2013 | Johnson, Jr. | |
| 8,471,528 B2* | 6/2013 | Toba | H02J 3/32 |
| | | | 320/128 |
| 8,643,336 B2 | 2/2014 | REINECCIUS ET AL. | |
| 8,674,666 B2* | 3/2014 | Thorvaldsson | H02J 3/1864 |
| | | | 323/207 |
| 8,994,217 B2 | 3/2015 | CHO ET AL. | |
| 9,041,345 B2 | 5/2015 | CHOI | |
| 9,071,056 B2 | 6/2015 | YANG ET AL. | |
| 9,406,981 B2 | 8/2016 | KIM | |
| 2005/0151513 A1 | 7/2005 | COOK ET AL. | |
| 2011/0144822 A1 | 6/2011 | Choi | |
| 2012/0253536 A1 | 10/2012 | Faley et al. | |
| 2012/0267952 A1 | 10/2012 | BALLATINE ET AL. | |
| 2012/0326504 A1 | 12/2012 | BALLANTINE ET AL. | |
| 2013/0099581 A1* | 4/2013 | Zhou | H02J 1/12 |
| | | | 307/82 |
| 2013/0113287 A1 | 5/2013 | SINGH ET AL. | |
| 2013/0214596 A9 | 8/2013 | Peterson et al. | |
| 2013/0214604 A1* | 8/2013 | Johnson, Jr. | H02J 3/26 |
| | | | 307/66 |
| 2016/0006253 A1 | 1/2016 | SAUSSELE ET AL. | |
| 2016/0211841 A1 | 7/2016 | HARRISON | |
| 2017/0005480 A1 | 1/2017 | BALLANTINE ET AL. | |

FOREIGN PATENT DOCUMENTS

| | | |
|---|---|---|
| EP | 1 002 353 | 5/2000 |
| EP | 1 933 441 | 6/2008 |
| EP | 2 019 467 | 1/2009 |
| EP | 2 348 597 | 7/2011 |
| WO | WO2009/030305 | 3/2009 |
| WO | WO-2011/141807 | 11/2011 |

OTHER PUBLICATIONS

International Search Report and Written Opinion for PCT/US2016/017953, Issued Apr. 19, 2016, 10 pages.
U.S. Appl. No. 14/626,181, filed Feb. 19, 2015, Cummins Power Generation IP, Inc.
"Digital Controls Technology," brochure, Cummins Power Generation Inc., 2013, 8 pages.
"Electricity: Always & Everywhere With Victron Phoenix Multi-Plus and a Honda Generator," Victron Energy B.V., no date listed; Applicant downloaded brochure on Sep. 26, 2013, 5 pages.
"FLEXGEN Battlefield Energy," Earl Energy FlexGen Diesel Generator Systems, no date listed on brochure; Applicant downloaded document on Mar. 20, 2014, 2 pages.
"FLEXGEN Battlefield Energy," Earl Energy FlexGen Power Systems, no date listed; brochure was downloaded by Applicant on Mar. 20, 2014, 2 pages.
"FLEXGEN Power Systems," FlexGen Power Systems, an Earl Energy Company, no date listed; Brochure downloaded by Applicant on Mar. 20, 2014, 2 pages.
McKenna, Phil, "Hybrid Power for the Frontline," MIT Technology Review, Mar. 10, 2011, 2 pages.
"Siemens helps Earl Energy Bring Distributed Power Generation to U.S. Army in Afghanistan," Siemens Industry, Inc. 2013, 4 pages.
Cahn, Dianna, "Battery System Stores Energy, Cuts Military Fuel Needs," The Virginian-Pilot, Oct. 16, 2012, PilotOline.com, 4 pages.
La Monica, Martin, "Hybrid Generator Would Cut Military Base Fuel Costs in Half," IEEE Spectrum, Feb. 3, 2014, 3 pages.
Taimela, Pasi and Olivo, Tony, "FlexGen Solid State Generator (SSG)," Earl Energy White Paper 14 pages, Feb. 18, 2013.
Notice of Allowance issued for on U.S. Appl. No. 14/626,181, dated Jul. 3, 2017, 13 pages.

* cited by examiner

ENERGY STORAGE SYSTEM

TECHNICAL FIELD

The present disclosure relates generally to the field of generators. More particularly, the present disclosure relates to systems and methods for controlling operation of an energy storage system configured to be coupled to one or more generator sets.

BACKGROUND

Generator sets can be used to power a wide variety of loads. Varying loads can be powered by one or more generator sets by increasing or decreasing a power output of the generator sets to meet load demand. However, if widely varying loads are connected to the generator sets, the size of the generator sets may be larger than needed to address ordinary load demand in order to meet occasional large demand. Additionally, variations in load demand or phase imbalances may cause the generator sets to operate inefficiently.

SUMMARY

One embodiment of the disclosure relates to an energy storage system. The energy storage system includes an energy storage device and a bidirectional inverter configured to control a flow of power into or out of the energy storage device. The energy storage system further includes a controller configured to control the bidirectional inverter based on one or more signals (e.g., digital or analog signals) received from a generator set coupled to the bidirectional inverter via an alternating current (AC) bus. The controller is configured to, based on the one or more signals, control the bidirectional inverter to store power generated by the generator set in the energy storage device and transmit power from the energy storage device to a load driven by the generator set to maintain the generator set within a range of one or more operating conditions.

Another embodiment relates to a method of controlling a flow of power to and from an energy storage system. The method includes receiving, at a controller of the energy storage system, one or more signals from a generator set. The method further includes monitoring, at the controller, one or more operating conditions of the generator set based on the one or more signals. The method further includes controlling a bidirectional inverter of the energy storage system to store power generated by the generator set in an energy storage device of the energy storage system and transmit power from the energy storage device to a load driven by the generator set to maintain the generator set within a range of one or more operating conditions. The bidirectional inverter of the energy storage system may be coupled to the generator set by an AC bus.

Another embodiment relates to a hybrid generator system including a generator set configured to generate power to drive a load via an AC bus. The hybrid generator system further includes an energy storage system including an energy storage device and a bidirectional inverter coupled in parallel to the generator set on the AC bus and configured to control a flow of power into or out of the energy storage device. The energy storage system further includes a controller configured to control the bidirectional inverter based on one or more signals received from the generator set. The controller is configured to, based on the one or more signals, control the bidirectional inverter to store power generated by the generator set in the energy storage device and transmit power from the energy storage device to a load driven by the generator set to maintain the generator set within a range of one or more operating conditions.

Another embodiment relates to an energy storage system including an energy storage device and a bidirectional inverter configured to control a flow of power into or out of the energy storage device via a plurality of phases. The energy storage system further includes a controller configured to control the bidirectional inverter based on a load condition on one or more of the plurality of phases. The controller is configured to control the bidirectional inverter to store power generated by a generator set in the energy storage device and transmit power from the energy storage device to a load driven by the generator set in response to detecting a load imbalance between the plurality of phases.

Another embodiment relates to a method of controlling a flow of power to and from an energy storage system. The method includes determining, at a controller of the energy storage system, a load condition on one or more of a plurality of phases of a local AC grid. The method further includes controlling a bidirectional inverter of the energy storage system to store power from the local AC grid in an energy storage device of the energy storage system and transmit power from the energy storage device to a load driven by the local AC grid in response to detecting a load imbalance between the plurality of phases.

Another embodiment relates to a hybrid generator system including a generator set configured to generate power to drive a load and an energy storage system. The energy storage system includes an energy storage device and a bidirectional inverter configured to control a flow of power into or out of the energy storage device via a plurality of phases. The energy storage system further includes a controller configured to control the bidirectional inverter based on a load condition on one or more of the plurality of phases. The controller is configured to control the bidirectional inverter to store power generated by the generator set in the energy storage device and transmit power from the energy storage device to the load in response to detecting a load imbalance between the plurality of phases.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
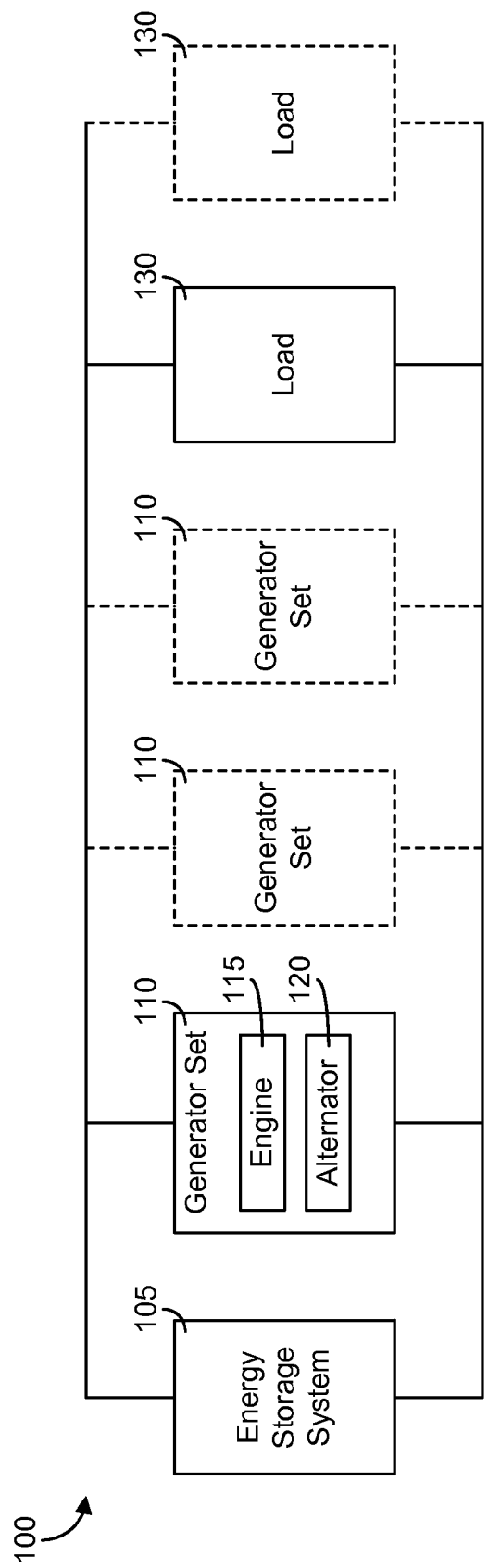
FIG. 1 is a block diagram illustrating a hybrid generator system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to power loads in conjunction with generators are provided according to exemplary embodiments. Generator sets, or gensets, are used to provide power to one or more loads, such as a local power network or grid (e.g., a power grid powering a location, such as a building, room or group of rooms, etc.). The power demands of the loads may vary with changing conditions, such as increasing and decreasing draw on the local grid. To address the changing load demand, gensets may increase or decrease the output power generated by the gensets, such as increasing power output with increased load, or decreasing the power output with decreased power demand. As a result, the gensets may operate outside of a preferred range of operating conditions (e.g., a range of operating conditions associated with efficient, such as fuel-efficient, operation of the genset) for at least a portion of time during which changes in demand are addressed. For example, increasing or decreasing an operating condition, such as a rotational velocity for a variable speed genset (e.g., rotations per minute, or RPM), of the engine of a genset, or increasing torque output for a fixed speed synchronous genset, may cause the engine to operate in a manner that utilizes fuel at a higher rate than in a preferred range of rotational velocities. Additionally, load transients due to changing load demand can affect quality of the power provided by the gensets (e.g., cause a voltage provided by the gensets to temporarily drop or spike) requiring gensets to react quickly to load changes or operate with excess power output capacity available as a "spinning reserve" for potential sudden demand increases.

The present disclosure provides exemplary systems and methods for utilizing an energy storage system that can be coupled to one or more gensets to help provide power to one or more loads in an AC paralleled hybrid configuration. An exemplary energy storage system includes an energy storage device (e.g., one or more batteries, capacitors or capacitor banks, etc.) and an inverter configured to control flow of power to and from the energy storage device. The inverter may be a bidirectional inverter configured to bi-directionally transmit power between the energy storage device and one or more generator sets coupled to the inverter (e.g., an output of the one or more generator sets). The inverter includes a controller configured to control operation of the bidirectional inverter. In some embodiments, the controller controls the inverter based on one or more digital or analog signals received from the genset(s). The signal(s) may be indicative of or provide information relating to one or more operating conditions of the genset(s). The energy storage system may control the inverter to storage power (e.g., excess power) generated by the genset(s) in the energy storage device and/or transmit power stored in the energy storage device to the load(s) based on the signal(s) and/or operating condition(s).

In some embodiments, the AC paralleled energy storage system may control the inverter to maintain one or more of the gensets within a range of operating conditions, such as a range associated with efficient (e.g., fuel-efficient) operation of the gensets. By using the energy storage system to supplement power generated by the gensets during high load demand and storing excess power generated by the gensets during low demand, the gensets can be operated more frequently within an efficient range of operating conditions. Further, in some embodiments, smaller, more efficient, less expensive gensets may be used to drive a particular load or loads, and the energy storage system can be used to help meet high demand conditions by reducing required surge capacity or spinning reserve needs, rather than using larger, less efficient, more expensive gensets to meet the need.

In some embodiments, the energy storage system may control operation of one or more of the gensets. For example, the energy storage system may be configured to generate and transmit signals to the gensets configured to control a state of the gensets (e.g., activate and/or deactivate the gensets) or may be one member of a masterless network of self-coordinating gensets (also known as masterless load demand, or MLD). The energy storage system may monitor network power conditions, and may activate and/or deactivate gensets in the network in order to meet varying load demand. By deactivating gensets when not needed to meet demand and/or utilizing excess energy previously stored in the energy storage system, the energy storage system reduces overall runtime, and fuel consumption, of the gensets. In some embodiments, the energy storage system may prevent fast cycling and only change a state of a genset if the energy storage system estimates the power demand can be met under the changed configuration for at least a threshold amount of time.

In some embodiments, the energy storage system may be configured to reduce transients seen by one or more of the gensets. Transients are caused by rapid increases or decreases in load demand. In the event of a rapid increase in demand, the energy storage system may stop charging and ramp up power output to supplement power generated by the gensets to help prevent or reduce a reduction in power quality (e.g., output voltage). In the event of a rapid decrease in demand, the energy storage system may absorb excess power from gensets to prevent pole slippage and/or spikes in output voltage (e.g., grid voltage). This may also allow the gensets to react to demand change gradually and lower the wear and stress incurred. In one embodiment, the change in genset output can be changed gradually, such as by a predetermined change time constant rate. This rate can be selected to avoid or reduce human perception (which is tuned to notice sudden changes), thus making the gensets more acceptable in urban or crowded environments. In yet other embodiments, the AC paralleling energy storage system can take an initial load demand for a standby, critical, or emergency power system when the primary power feed fails, allowing a standby genset to start and come up to speed gradually to take the load. This reduces wear on the standby genset and can allow use of lower cost gensets that could not otherwise start up and take the load in the time required.

Referring to FIG. 1, a hybrid generator system 100 including an energy storage system 105 and one or more generator sets (gensets) 110 is shown according to an exemplary embodiment. In the illustrated embodiment, genset 110 includes an engine 115 coupled to an alternator 120. Engine 115 may be any type of machine configured to convert energy, such as fuel, into mechanical energy (e.g., motion). Engine 115 may be an internal combustion engine, such as a diesel engine. Alternator 120 may be any type of machine configured to convert mechanical energy into electrical energy, such as an alternating current. In some embodiments, genset 110 may include different and/or additional components than engine 115 and alternator 120 (e.g., a hydraulically powered generator driven using hydraulic fluid). Genset 110 may be a mastered or masterless system (e.g., a masterless load demand genset system or a mastered paralleled genset system). While FIG. 1 illustrates a single energy storage system 105 connected in parallel with a genset 110 and two additional, optional gensets 110, it should be understood that any number of energy storage systems and any number of gensets may be utilized.

Energy storage system 105 is configured to provide power to supplement the power generated by genset 110 to drive load 130 (e.g., in periods of high demand) and store excess power generated by genset 110 (e.g., in periods of low demand). Energy storage system 105 can operate in parallel with genset 110 to meet larger load demand than genset 110 would be capable of supporting on its own. In some embodiments, energy storage system 105 can operate on its own for at least a period of time to supply light loads without genset 110. Energy storage system 105 may be configured to charge an energy storage device of energy storage system 105 in a manner such that genset 110 is maintained operating in a fuel efficient operating range when external system demand/load decreases, storing the excess power (e.g., rather than operating genset 110 at an operating point above or below an efficient range to charge the energy storage device). Alternatively, energy storage system 105 may be configured to source power onto the parallel AC connection when external system demand/load increases (and discharge an energy storage device of energy storage system 105) such that genset 110 is maintained operating in a fuel efficient operating range, rather than increase genset 110 output into an inefficient operating range to service the increased load. Energy storage system 105 may also serve to provide a surge capacity, and may supply power immediately, or nearly immediately, upon sudden frequency dips or voltage drops (e.g., in the case of "dumb" loads, or loads that do not provide information about when changes in load demand will occur in advance of the changes). In some embodiments, energy storage system 105 may act as a "smart" load, and may alert genset 110 that it will load the system to allow genset 110 to spool up or preload the system to increase the effective spinning reserve capacity in anticipation of large loads suddenly coming online. Energy storage system 105 may store excess power generated until the increased load appears.

AC paralleled energy storage system 105 may operate as an independent module that adds energy storage capacity to genset 110. In some embodiments, the AC paralleled energy storage system 105 may be added to an existing genset 110 or coupled paralleled to the grid serviced by the genset 110 to convert genset 110 into a hybrid generator system by sourcing to or charging from the paralleled AC output/grid. Energy storage system 105 may have an interface (e.g., control interface, network connection, etc.) through which energy storage system 105 may communicate with genset 110 (e.g., receive signals from and/or transmit signals to genset 110). In some embodiments, during operation, energy storage system 105 may act or appear to the power generation system or fellow co-paralleled gensets as a genset without a governor response (e.g., allowing for instantaneous or near-instantaneous response to changing load demand). Energy storage system 105 may transmit signals to genset 110 indicating to genset 110 that energy storage system 105 should be treated by genset 110 as if it was a genset itself. This may allow energy storage system 105 to be connected in a "plug-and-play" manner, with little or no modification to genset 110, which may be a conventional synchronous genset or a variable speed genset. In some embodiments, the AC paralleled energy storage system 105 may allow any genset that can be coupled in parallel with the energy storage system 105 to act as a hybrid generator system or as a smart hybrid system if communication interfaces are available to allow coordination.

Figure 2:
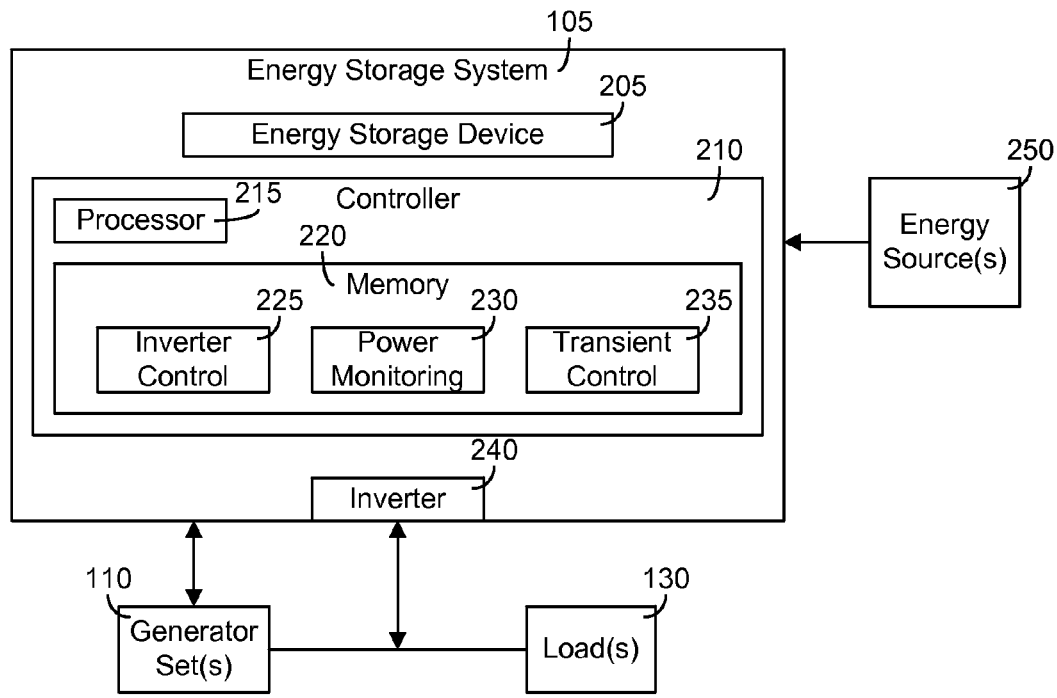
FIG. 2 is a detailed exemplary implementation of the energy storage system of FIG. 1.

FIG. 2 shows a more detailed exemplary implementation of energy storage system 105. In the illustrated implementation, energy storage system 105 includes an energy storage device 205. Energy storage device 205 may be, or include, any type of device capable of storing electrical energy, such as one or more batteries, one or more capacitors (e.g., ultracapacitors), etc. Energy storage system 105 also includes an inverter 240 configured to transmit power to and/or receive power from one or more gensets 110, one or more loads 130, and/or one or more power transmission lines configured to transmit power between genset(s) 110 and load(s) 130. Inverter 240 may be a bidirectional inverter configured to bi-directionally transmit power between energy storage device 205 and genset(s) 110 and/or load(s) 130. For example, inverter 240 can transmit power stored in energy storage device 205 to help drive load(s) 130, and inverter can store excess power generated by genset(s) 110 in energy storage device 205. In some embodiments, inverter 240 may be a one-way inverter, and energy storage system 105 may further include a rectifier and/or DC-DC converter to provide power flow in the other direction.

In some embodiments, energy storage system 105 may include multiple inputs and/or outputs (e.g., power inputs/outputs). For example, energy storage system 105 may include an alternating current (AC) input configured to receive AC power from an external source (e.g., a power grid) and store the power in energy storage device 205 and/or transmit the power to load(s) 130 via inverter 240. In some embodiments, the AC power may be received and transmitted to a DC bus of energy storage system 105 (e.g., via an AC-DC converter of energy storage system 105). In one such embodiment, energy storage system 105 may provide power grid distribution and isolation via the AC input, such as by breaking up and/or isolating portions of a local grid by receiving AC power at the AC input, transmitting the power to the DC bus of energy storage system 105, and outputting AC power through inverter 240. Alternatively, two energy storage devices 105, each with single bi-directional inverters 240, can be placed back to back, one on a first grid and one on a second grid and coupled to share power via their DC buses. This may help increase fault tolerance, simplify and/or reduce power cabling, provide local surge protection (e.g., via energy storage device 205), and/or provide resilience against damage (e.g., for military/combat applications).

Energy storage system 105 may additionally, or alternatively, include a direct current (DC) input. The DC input may allow for DC bus paralleling using the internal DC bus of energy storage system 105 and connections to other DC buses (e.g., operating with other energy storage systems and/or gensets, such as variable speed gensets, with an interim DC bus). In some embodiments, the other DC buses may have similar voltage to the DC bus of energy storage system 105. In other embodiments, the other DC buses may have a different voltage, and energy storage system 105 may include a DC-DC converter to convert the voltage of the input power to the internal DC bus voltage.

The AC and/or DC inputs may be used to take power input from an external source (e.g., a dirty or noisy source, such as a noisy, voltage or frequency-instable grid or weak grid, or unreliable renewable sources, such as wind or solar) and clean up the power. The clean power can be re-emitted on an isolated local grid through inverter 240. This may enable further fuel savings in systems where local standby gensets would normally be triggered to provide power when the local grid is disconnected from a weak or unstable utility grid. Excess power can be stored in energy storage device 205, and insufficient power can be supplemented using energy stored in energy storage device 205. Inverter 240 may be used to perform power factor correction on a local grid. Thus, energy storage system 105 may be used to support weak local grids, such as at the end of a long transmission line, or subject to local brown outs, sourcing power as needed and recharging when power is strong again on the grid.

In some embodiments, energy storage system 105 may input power from one or more external energy sources 250 using the AC and/or DC inputs. For example, input power may be received from one or more external energy sources (e.g., renewable energy sources), such as photovoltaic-powered sources, solar-powered sources, wind-powered sources, solid oxide fuel cells, PEM fuel cells, geo-powered sources, thermal-powered sources, electric-powered sources, etc. In one exemplary implementation, energy storage system 105 may include a DC-DC converter configured to receive power input from energy source(s) 250 and convert a voltage of the power input to a voltage of the internal DC bus of energy storage system 105. Power from external energy source(s) 250 may be stored in energy storage device 205 and/or transmitted to load(s) 130, and may be used to supplement power on a local grid. DC paralleling with additional AC paralleling energy storage systems 105, or "dumb" energy storage/production systems (such as battery packs, fast storage capacitor banks, or fuel cells), or the internal DC buses of variable speed gensets. DC paralleling can also be used to wear level and condition battery systems between multiple energy storage systems 105.

Energy storage system 105 further includes a controller 210 configured to control operation of inverter 240. Controller 210 may include a processor 215, which may be any type of general purpose or special purpose processor (e.g., FPGA, CPLD, ASIC, etc.). Controller 210 may also include a memory 220, which may include any type of computer or machine-readable storage medium (e.g., RAM, ROM, PROM, magnetic storage, optical storage, flash storage, etc.). In some embodiments, controller 210 may include an input/output (I/O) module or other control interface through which controller 210 can communicate with other components (e.g., receive data from and/or transmit data and/or control signals to other components, such as genset(s) 110).

Controller 210 may include one or more modules configured to implement one or more functions of controller 210. In some embodiments, the modules may be implemented as computer or machine-readable instructions stored in memory 220 that are executable by processor 215 to perform the functions. In some embodiments, the modules may additionally or alternatively be implemented, in whole or in part, via hardware modules (e.g., integrated circuits).

In the illustrated embodiment, controller 210 includes an inverter control module 225. Inverter control module 225 is configured to control an operational state of inverter 240. Module 225 may control the state of inverter 240 based on operational characteristics of genset(s) 110 and/or load(s) 130, for example. In some embodiments, module 225 may cause inverter 240 to change states in response to detecting a change in a power demand of the load. For example, if module 225 detects an increase in load demand, module 225 may cause inverter 240 to transmit power from energy storage device 205 to load(s) 130 to supplement power generated by genset(s) 110 to meet the demand. If module 225 detects a decrease in load demand, module 225 may cause inverter 240 to receive power from genset(s) 110 and store the power in energy storage device 205. Module 225 may also monitor a state of charge of energy storage device 205 and control inverter 240 to receive power from genset(s) 110 in response to detecting a low charge condition (e.g., a charge below a threshold charge level). In some embodiments, module 225 may control inverter 240 based on operational characteristics of genset(s) 110 and/or load(s) 130 to maintain genset(s) 110 within a range of operating conditions (e.g., an efficient operating range).

Power monitoring module 230 is configured to monitor a power state of genset(s) 110 and/or the power network/grid. Power monitoring module 230 may monitor the power capacity of the network to determine whether to activate or deactivate one or more paralleled companion gensets. If more gensets are running than needed to meet load demand (i.e., excess power generation capacity is online), module 230 may generate and transmit a control signal to one or more of the gensets configured to cause the gensets to deactivate (e.g., power down, enter a low-power sleep state, etc.) if the energy storage system 105 is fully or sufficiently charged and provide any missing power demand from the energy storage system 105. Alternatively, if energy storage system 105 is not at a full or sufficiently high state of charge, it can absorb the excess power generation capacity to charge itself and keep the operating gensets in their most efficient operation ranges. Once fully or sufficiently charged, the energy storage system 105 can cycle off the excess gensets/capacity off and provide the remaining power demand from its storage. If energy storage system 105 and a set of zero or more currently active gensets are insufficient to meet load demand, module 230 may activate (e.g., power up, wake from a low-power sleep state, etc.) one or more gensets to help meet the demand. In some embodiments, module 230 may attempt to activate a minimum number of gensets needed to meet the load demand to help reduce fuel consumption and increase efficiency of the system.

Transient control module 235 is configured to control energy storage system 105 to help reduce transients seen by genset(s) 110. For example, in the event of a large load step (e.g., a rapid increase in load demand, such as an amount or rate increase above a threshold), transient control module 235 may control inverter 240 to stop charging energy storage device 205, if energy storage device 205 is currently being charged, and ramp power output up from energy storage device 205 through inverter 240 to help meet the increased demand. In some embodiments, module 235 may control inverter 240 to temporarily increase a commanded charge/discharge rate to help account for rapid increases/decreases in load demand. Module 235 may be configured to help reduce the transients seen by genset(s) 110 in the event of such rapid changes in load demand and help maintain power quality (e.g., avoid substantial spikes or dips in voltage provided by genset(s) 110). The energy storage system 105 may optionally have one or more local energy storage subsystems either internally or externally coupled to it. These local energy storage subsystems may have differing voltage levels, rates of charge/discharge, storage capacity, charge/discharge lifetime limits, operating temperature limits, etc. In one example embodiment, a super capacitor subsystem is coupled to the energy storage system 105 and configured to handle surge demands and rapid charge/discharge demand transients, while other storage subsystems are utilized for longer duration charge/discharge cycles. In some embodiments, module 235 may use the surge capacity of energy storage system 105 to reduce transients, for example, supporting surges to allow matching (e.g., exact "right-size" matching) of genset capacity to expected load (e.g., average expected load) and supporting sudden increases in load in a surge capacity until other gensets can be brought online or a genset system started upon loss of utility grid power (e.g., acting as an uninterruptible power supply, or UPS) and/or absorbing excess power from other gensets in sudden load decreases (e.g., to prevent pole slippage, or to support grid code compliance by absorbing power to allow low voltage event ride through).

Figure 3:
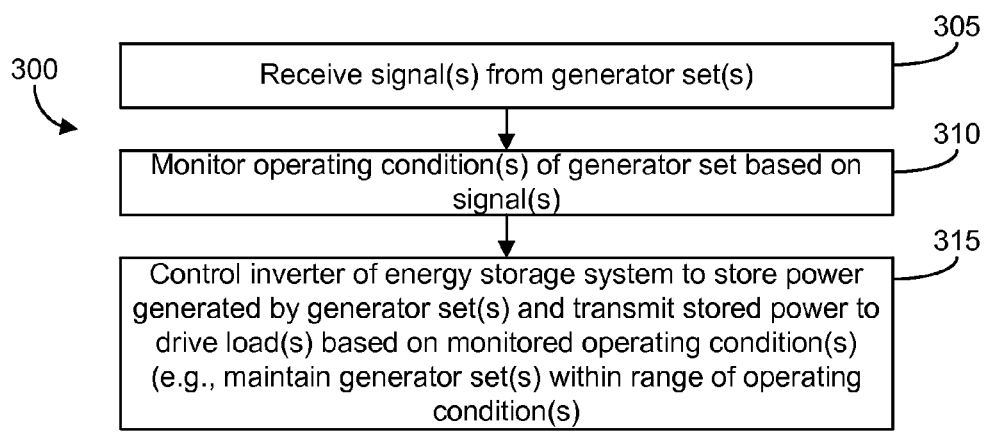
FIG. 3 is a flow diagram of a process for controlling an energy storage system according to an exemplary embodiment.

FIG. 3 illustrates a flow diagram of a process 300 for controlling an energy storage system according to an exemplary embodiment. Process 300 may be executed by controller 210 of system 200 (e.g., by inverter control module 225).

Referring to both FIGS. 2 and 3, controller 210 receives one or more signals from one or more generator sets communicatively coupled (e.g., through wired or wireless communication interfaces) to controller 210 (305). The signals may be indicative of, or related to, one or more operating conditions of one or more gensets 110 and/or one or more loads 130. For example, the signals may indicate a rotational velocity (e.g., RPM), fuel consumption, temperature, power output, voltage, current, frequency, operating time, and/or other operating conditions of genset(s) 110. Controller 210 is configured to monitor one or more operating conditions of genset(s) 110 and/or load(s) 130 (310). Controller 210 may monitor the operating conditions based on the received signals.

Controller 210 is configured to control inverter 240 to store power (e.g., excess power) generated by genset(s) 110 and/or transmit stored power to drive load(s) 130 based on the monitored operating conditions (315). Controller 210 may control inverter 240 to maintain one or more of genset(s) 110 within a range of the operating conditions. For example, each genset 110 may have a particular range of one or more operating conditions, such as an engine RPM range, in which the genset 110 operates most efficiently (e.g., uses a lowest amount of fuel). Controller 210 may monitor the RPM or torque output condition of the engine and control inverter 240 to receive excess power generated by genset(s) 110 and/or supplement power generated by genset(s) 110 to meet demand of load(s) 130 while maintaining genset(s) 110 within the efficient RPM or torque output range of the engine(s) (e.g., rather than allowing genset(s) 110 to operate the engine above or below the efficient range to meet the load demand). In some embodiments, controller 210 may be provided with data from which controller 210 determines the range of operating conditions (e.g., efficient range) for each genset 110 (e.g., configuration data). In some embodiments, controller 210 may observe one or more operating parameters (e.g., fuel use data) from genset(s) 110, and may infer the desired range of operating conditions through observation of the parameters over one or more operating cycles.

In some embodiments, controller 210 may be configured to change an operational state of inverter 240 based on changes in load power demand, such as by comparing changes in load demand to a threshold level. For example, controller 210 may monitor a load demand and determine whether the demand increases or decreases above a threshold level (e.g., whether the amount of demand or rate of increase/decrease exceeds a threshold level). In response to the change exceeding the threshold, controller 210 may change an operational state of inverter 240 (e.g., change a direction of current flow through inverter 240 and/or increase or decrease a charge/discharge rate).

Controller 210 may detect an increase in power demand above a threshold increase. For example, controller 210 may detect an amount of power demand (e.g., in kilowatts, or kW) increase above a threshold increase amount and/or a rate increase above a threshold rate (e.g., indicating a rapid increase in load demand). In response, controller 210 may control inverter 240 to discharge power stored in energy storage device 205 to drive load(s) 130. In some embodiments, controller 210 may control an amount or rate of discharge based in part on the power demand and/or other operating parameters of genset(s) 110 and/or load(s) 130 (e.g., to maintain genset(s) 110 within a range of the operating conditions and prevent genset(s) 110 from operating outside of the desired range to meet the increased demand).

Controller 210 may detect a decrease in power demand above a threshold decrease. For example, controller 210 may detect an amount of power demand decrease above a threshold decrease amount and/or a rate decrease above a threshold rate (e.g., indicating a rapid drop in load demand). In response, controller 210 may control inverter 240 to charge energy storage device 205 using power generated by genset(s) 110 in excess of the load demand. In some embodiments, controller 210 may control an amount or rate of charge based in part on the power demand and/or other operating parameters of genset(s) 110 and/or load(s) 130 (e.g., to maintain genset(s) 110 within a range of the operating conditions and prevent genset(s) 110 from operating outside of the desired range to adjust to the decreased load demand).

In some embodiments, controller 210 may generate control signals configured to cause genset(s) 110 to change an operating state. For example, controller 210 may transmit control signals to one or more genset(s) to cause them to activate or deactivate to meet changes in load demand while reducing fuel consumption of the overall generator system. Controller 210 may control inverter 240 to charge energy storage device 205 with excess power generated by genset(s) 110 while genset(s) 110 operate within a range of operating conditions. Controller 210 may generate control signals configured to cause one or more genset(s) 110 to deactivate, for example, in response to determining that load demand can be met without all genset(s) 110 active and/or a current power generated by the active genset(s) 110 within the range of operating conditions exceeding load demand by a greater amount or rate than can be stored in energy storage device 205 (e.g., such that one or more genset(s) 110 would be operated outside of the desired range of operating conditions to adjust to the lower demand, if all genset(s) 110 remained active).

Controller 210 may control inverter 240 to discharge power from energy storage device 205 to drive load(s) 130. Controller 210 may generate control signals configured to cause one or more genset(s) 110 to activate to help drive load(s) 130, for example, if the combined capacity of the currently active genset(s) 110 and energy storage system 105 is insufficient to meet load demand. Controller 210 may generate control signals configured to cause one or more genset(s) to deactivate while energy storage system 105 is helping drive load(s) 130, in some embodiments. For example, if controller 210 determines load demand can be met using power stored in energy storage device 205 and a lesser number of genset(s) 110 than are currently active, controller 210 may deactivate one or more genset(s) 110 to conserve fuel and/or allow the remaining genset(s) 110 to operate in the desired range of operating conditions.

Figure 4:
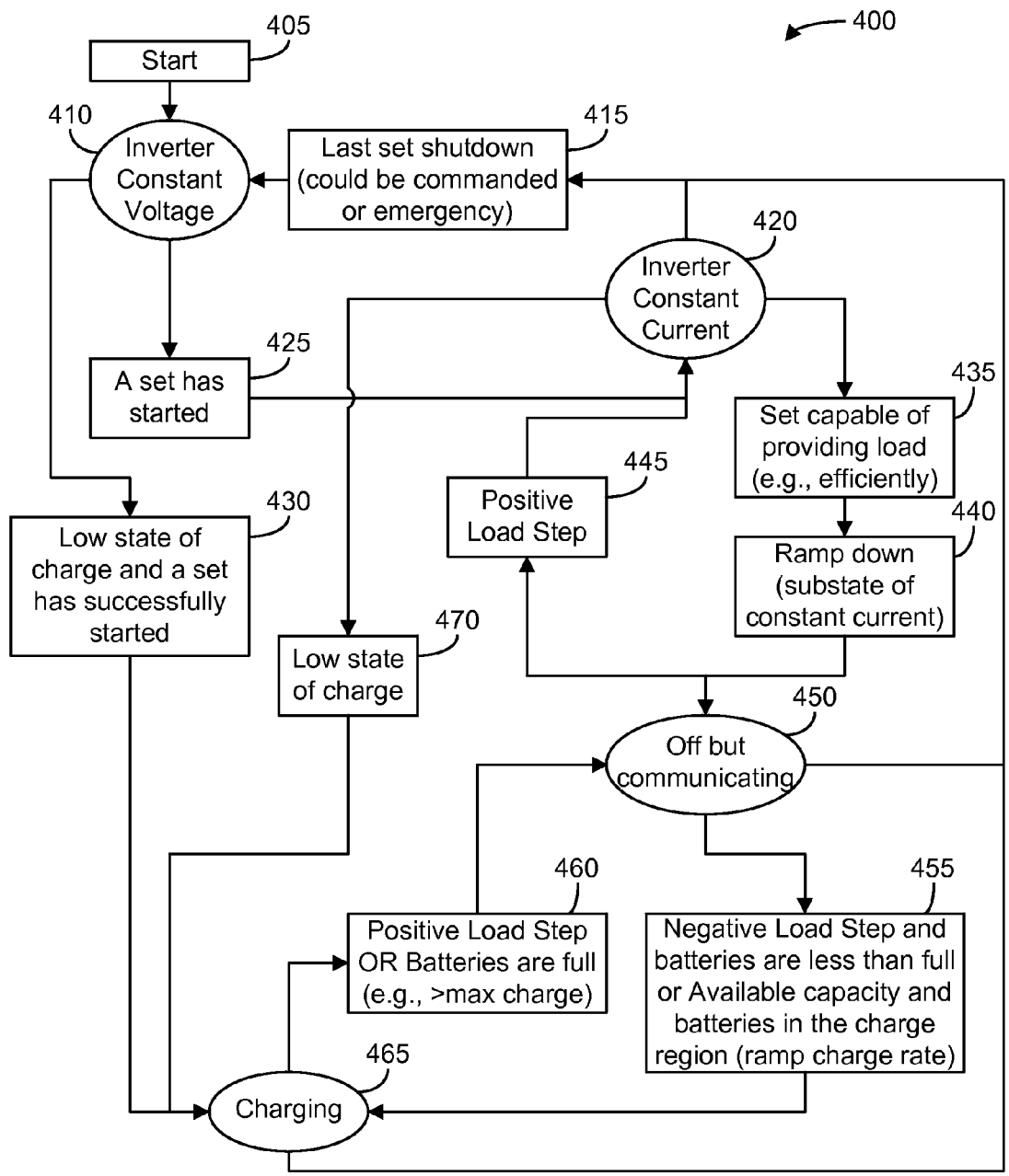
FIG. 4 is a state diagram of an energy storage system control scheme according to an exemplary embodiment.

FIG. 4 is a state diagram 400 of an energy storage system control scheme according to an exemplary embodiment. State diagram 400 may be utilized by controller 210 (e.g., inverter control module 225) to control operation of inverter 240. In some embodiments, controller 210 may be configured to increase or decrease its priority in the paralleled system of genset(s) 110 to allow it to preempt other gensets when it is fully charged or in need of charging.

Referring to both FIGS. 2 and 4, controller 210 may start operation (405) in a constant voltage state 410. In some embodiments, a start may occur with a low or minimal load 130 attached to genset(s) 110. In constant voltage state 410, controller 210 may control inverter 240 to discharge power stored in energy storage device 205 at a substantially constant voltage (e.g., a voltage level within a threshold distance of, or range around, a set output voltage value). Once a genset 110 starts (e.g., is activated), controller 210 determines whether to transition inverter 240 to either a charge state 465 or a constant current state 420. If a genset 110 starts and energy storage device 205 is in a low charge state (e.g., a state of charge, or SOC, of energy storage device 205 is below a threshold value) (430), controller 210 transitions inverter 240 to charge state 465. In charge state 465, power generated by the active genset(s) 110 is used to charge energy storage device 205. In some embodiments, charging may be limited by a maximum power (e.g., maximum AC power) setting.

If a genset 110 starts and energy storage device 205 is not in a low charge state (425), controller 210 transitions inverter 240 to constant current state 420. In constant current state 420, inverter 240 is controlled to discharge power from energy storage device 205 to maintain a substantially constant current (e.g., a current level within a threshold distance of, or range around, a set output current value). If one or more active genset(s) 110 are capable of meeting load demand (e.g., within an efficient operating range of genset(s) 110) (435), controller 210 may ramp down a current output of energy storage device 205 (440). Controller 210 may place energy storage system 105 in an off state 450. In off state 450, inverter 240 is controlled such that power does not flow to or from energy storage device 205. Controller 210 continues receiving operating condition data and monitoring load demand and/or operation of genset(s) 110. If load demand increases (445), controller 210 may return energy storage system 105 to constant current state 420. If energy storage device 205 enters a low state of charge while in constant current state 420 (470), controller 210 may transition energy storage system 105 into charge state 465.

While in off state 450, if controller 210 detects a decrease in load demand and a state of charge of energy storage device 205 that is less than full or under a threshold charge level, or detects that there is available capacity in excess of load demand and energy storage device 205 is in a charge region (e.g., a state of charge range in which energy storage device 205 is permitted to charge) (455), controller 210 may transition energy storage system 105 to charge state 465. If load demand increases while in charge state 465 and/or the state of charge of energy storage device 205 is at or above a maximum charge level (e.g., energy storage device 205 is full) (460), controller 210 may transition energy storage system 105 to off state 450. In some embodiments, controller 210 may transition energy storage system to constant current state 420 to meet the increased load demand. In the illustrated embodiment, in any of constant current state 420, off state 450, or charge state 465, if a last active genset 110 is deactivated (e.g., by command of controller 210 or by emergency shutdown conditions, such as a failure of the genset 110) (415), controller 210 may transition energy storage system 105 to constant voltage state 410.

Figure 5:
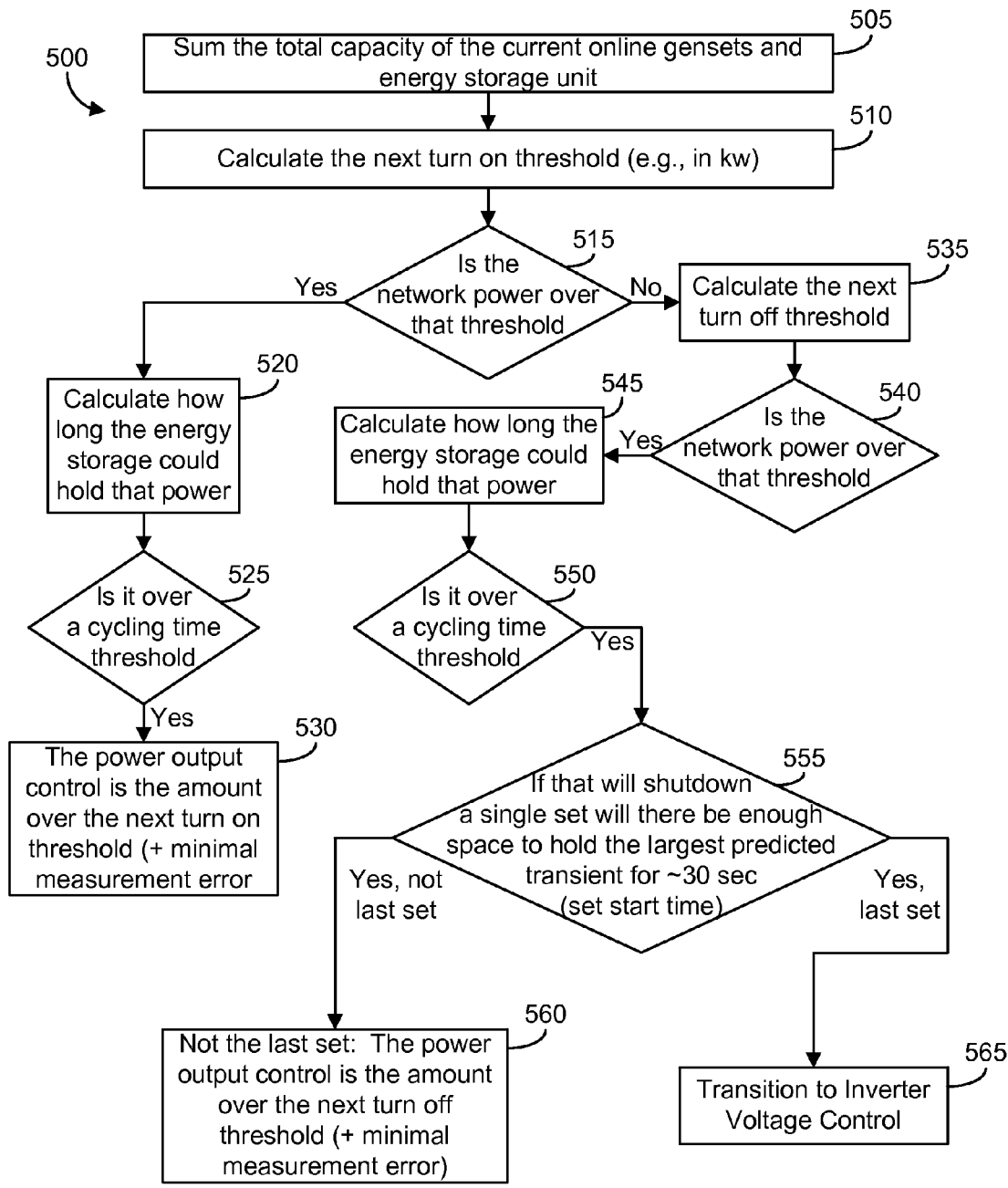
FIG. 5 is a flow diagram of a process for controlling network power using an energy storage system according to an exemplary embodiment.

FIG. 5 is a flow diagram of a process 500 for controlling network power using an energy storage system according to an exemplary embodiment. Process 500 may be executed by controller 210 (e.g., power monitoring module 230) to control operating states (e.g. activation and/or deactivation) of one or more gensets 110. For example, process 500 may be used to keep a low (e.g., minimum) number of gensets 110 active to meet current load demand, while preventing fast cycling and avoiding pushing the system into a state it is incapable of maintaining for at least a threshold amount of time (e.g., threshold number of minutes). In some embodiments, process 500 may be used (e.g., in combination with process 600, described below) to help ensure there is sufficient capacity to allow energy storage system 105 to help provide transient support.

Referring to both FIGS. 2 and 5, controller 210 may sum a total capacity of the current online gensets 110 and energy storage device 205 (505). Controller 210 may determine or estimate the current capacity of each genset 110 and/or a combination of multiple gensets 110 based on signals received from the gensets 110.

Controller 210 may determine (e.g., calculate) a next turn on threshold (e.g., in kW) (510). The next turn on threshold may be a threshold level past which (e.g., below which) an inactive genset 110 may be activated to help meet load demand. In some embodiments, the next turn on threshold may be a user configurable threshold value, such as a percent of total network power or a fixed amount of power (e.g., in kW).

Controller 210 determines if the network power (e.g., total capacity) is over the next turn on threshold (e.g., if the total capacity is below the threshold level) (515). If so, controller 210 calculates how long the system (e.g., energy storage system 105) could maintain the current power level of the system (520). If the time for which the power level is expected to be maintained below the threshold exceeds a cycling time threshold (525), an inactive genset 110 may be activated, and the power output control may be set by controller 210 to a current amount over the next turn on threshold (plus, in some embodiments, a measurement error) (530).

If the network power is not over the next turn on threshold, controller 210 calculates the next turn off threshold (535). The turn off threshold may be a threshold level past which (e.g., above which) an active genset 110 may be deactivated (e.g., in the occurrence of a low load demand). In some embodiments, the next turn off threshold may be a user configurable threshold value, such as a percent of total network power or a fixed amount of power (e.g., in kW).

Controller 210 determines if the network power is over the next turn off threshold (540). If so, controller 210 determines how long the system (e.g., energy storage system 105) could maintain the current power level of the system (545). If the time for which the power level is expected to be maintained past the threshold exceeds a cycling time threshold (550), controller 210 determines if deactivating a genset 110 will result in enough capacity (e.g., energy storage device 205 capacity) to hold a largest predicted transient for at least a threshold amount of time (e.g., 30 seconds) (555). If not, controller 210 may not deactivate a genset 110. If so, and the genset 110 considered for deactivation is not a last active genset 110, controller 210 may deactivate a genset 110 and set a power output control to an amount over the next turn off threshold (plus, in some embodiments, a measurement error) (560). If the genset 110 considered for deactivation is the last active genset 110, controller 210 may transition energy storage system 105 to a voltage control (e.g., constant voltage) mode (565).

Figure 6:
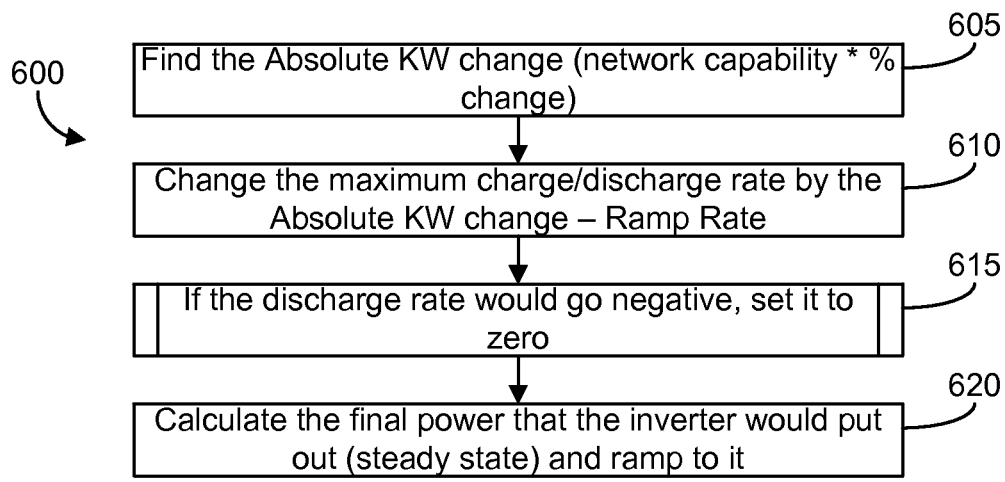
FIG. 6 is a flow diagram of a process for controlling transients using an energy storage system according to an exemplary embodiment.

FIG. 6 is a flow diagram of a process 600 for controlling transients using an energy storage system according to an exemplary embodiment. Process 600 may be executed by controller 210 (e.g., transient control module 235) to control inverter 240 to help reduce transients seen at genset(s) 110. In some embodiments, process 600 may be utilized if load demand has changed by greater than a threshold amount or rate.

Referring to FIGS. 2 and 6, controller 210 may determine an amount (e.g., relative amount) of power demand change (605). In some embodiments, the amount of change may be calculated as the network capability multiplied by the percentage of change in demand. In some embodiments, the amount may be an absolute power change (e.g., in kW). Controller 210 may adjust a maximum charge/discharge rate of energy storage system 105 based on the determined amount of change (610). For example, controller 210 may increase the discharge rate based on the determined amount to meet a rapid increase in load demand and/or may increase the charge rate based on the determined amount to meet a rapid decrease in demand. In some embodiments, the adjusted rate may be higher than a normal maximum charge/discharge rate used during normal (e.g., non-rapid) changes in load demand. If the discharge rate would go negative, controller 210 may set the discharge rate to zero (615). Controller 210 may calculate a final power that inverter 240 would provide (e.g., steady state), and may adjust operation of inverter 240 to ramp up/down to that final power level (620). In some embodiments, if the charge rate would go negative, and the state of charge of energy storage device 205 is above a threshold state of charge, controller 210 may transition energy storage system 105 to a current control state (e.g., constant current state).

In some embodiments, an energy storage system such as energy storage system 105 may be utilized in a multiple-phase implementation to help monitor and balance loading on the phases. Generator sets or alternators can have an unbalanced load attached to them. For example, a three phase alternator can have a heavy load on one or two of the phases and a light load on the third, or a heavy load on one phase and light load on the other two phases, and so on. This can lead to higher neutral line currents and heating, and can additionally lower power quality because of the voltage imbalance between phases. In other situations, a load on one or two phases could also be unbalanced by having the load demand on the phase exceed the phase's continuous or surge capacity, potentially causing system de-rate or shutdown, but yet not have the overall load exceed the total generator set/alternator output rating.

In some systems, active filtering is used with inverters and other power electronic controls to sense the local grid and condition and smooth the power on it via feedback control on the inverter. However, while active filtering will smooth out the power seen on the local grid, it will not fully balance the load on an unbalanced generator set or alternator feeding power in to the local grid, or if it does help load balance it will be as a secondary result of power smoothing, and will not be maintained for very long.

Figure 7:
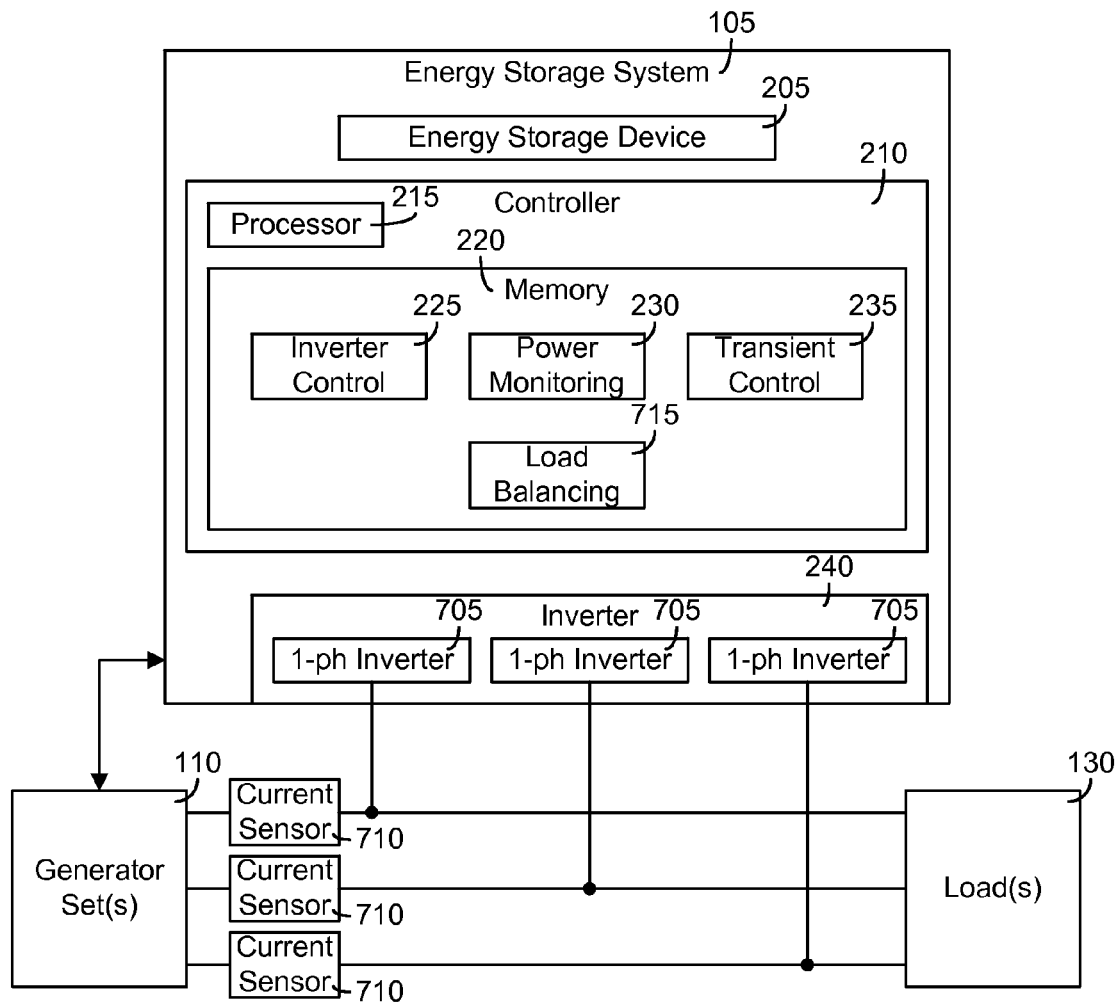
FIG. 7 is a block diagram of a hybrid generator system according to another exemplary embodiment.

Referring now to FIG. 7, a block diagram of a multiple-phase hybrid generator system including an energy storage system 105 configured to help balance loading across phases is shown according to an exemplary embodiment. Energy storage system 105 can include components similar to any or all of the components shown in FIG. 2, such as inverter control module 225, power monitoring module 230, transient control module 235, and bidirectional inverter 240. In some embodiments, components common to FIGS. 2 and 7 may include the same or similar features as described above with respect to FIG. 2.

In the implementation illustrated in FIG. 7, energy storage system 105 includes a load balancing module 715. Load balancing module 715 is configured to determine a load condition on one or more of the phases over which generator set(s) 110 transmit power to drive load(s) 130. Load balancing module 715 is configured to detect a load imbalance on one or more of the phases. In some embodiments, load balancing module 715 may work alone or in conjunction with power monitoring module 230 to monitor load conditions on the phases. In some embodiments, load balancing module 715 may monitor a voltage of the phases and monitor load conditions and/or detect imbalances based on the voltage. In some embodiments, energy storage system 105 may receive current signals from one or more current sensors 710 (e.g., clamp-style sensors, in-line sensors, etc.) configured to monitor current flowing through one or more phases, and load balancing module 715 may monitor load conditions and/or detect imbalances in load using the current signals.

Load balancing module 715 is configured to control inverter 240 to store power from generator set(s) 110 and/or transmit stored power to help drive load(s) 130 in response to the imbalance. In some embodiments, inverter 240 may include separate single-phase inverters 705 for each of the phases. Each single-phase inverter 705 controls a flow of power into and out of energy storage device 205 for a single phase. Load balancing module 715 can independently control flow of power into and out of energy storage device 205 by controlling single-phase inverters 705 (e.g., via separate control signals transmitted to single-phase inverters 705). In some embodiments, each single-phase inverter 705 may be coupled to one or more secondary energy storage devices (e.g., one or more batteries or one or more capacitors/supercapacitors) configured to temporarily store power transmitted from energy storage device 205 before transmitting the power to help power a heavily loaded phase.

Load balancing module 715 can be used to balance the load on the generator set/alternator phases and store the excess power of a previously unloaded phase in energy storage device 205. This stored power could then be used to provide spinning reserve, surge fill in, or allow generator set(s) 110 to turn off under light load or inefficient operating conditions, such that power for load(s) 130 can be provided by energy storage system 105. Under high, yet unbalanced load conditions, energy storage system 105 could provide the extra power demanded to keep the heavily loaded phases from getting overheated or exceeding the alternator damage curve. This extra power could come from energy stored in energy storage device 205 and/or from pulling and transferring power from the more lightly loaded phases. For power transfer, power could be stored temporarily (e.g., by energy storage devices coupled to single-phase inverters 705) before being reconverted and pushed on to the heavy demand phases. In some embodiments, pure power electronics phase to phase direct conversion could be used.

Because the electricity flows in a fungible manner, energy storage system 105 need not be an integral part of generator set(s) 110, and could be a separate standalone unit. In some embodiments, energy storage system 105 could be used as an add on to pre-existing generator sets or paralleled generator set farms of any origin, and they or their control systems would not necessarily need to know how energy storage system 105 operates or even be able to communicate with energy storage system 105 to still benefit. In some such situations, load balancing module 715 could determine that the local power load is unbalanced and the correction needed (e.g., via current sensors 710 and/or by monitoring the voltage differences in the phases. Other power factors could also be considered and incorporated, such as harmonics and power factor, etc. A correction could be applied to the grid using a feedback loop until the currents balance (e.g., within a threshold level of one another) or the voltage differences or other bad load characteristics are reduced or eliminated.

In some embodiments, load balancing module 715 may determine and utilize one or more characteristics of generator set(s) 110 in controlling operation of inverter 240. If, for example, the alternator characteristics of generator set(s) were known, such as the generator damage curve, load balancing module 715 can utilize this information in combination with the load condition information to control flow of power to and from energy storage device 205 to store excess power and/or help drive load(s) 130 on one or more phases. This may allow energy storage system 105 to better manage generator set(s) 110/alternator loading, such as by engage in phase peak shaving to prevent individual phases from becoming overloaded under high unbalanced load conditions. Further communications with the associated genset(s) (e.g., through a central controller or via a master-less load demand control (MLD) where energy storage system 105 could appear as just another generator set) could allow for increased coordination and efficiencies (e.g., when dealing with a generator set farm with differing sized generator sets that can be switched on and off to meet load demand).

In some implementations, energy storage system 105 can be used with small generator set installations, particularly multiple generator set sites such as with military applications. Energy storage system 105 may provide automatic balancing of phases that generally will see varying and ad hoc load demands in such applications. Load balancing can provide an improved benefit for smaller alternators (e.g., due to magnitude of phase differences likely to be seen). In addition, power scavenged by phase balancing can be put to use in fuel savings with AC paralleling, as described above.

In some implementations, a utility grid connection feeding power onto a local power grid could have a weak phase or an unbalanced load demand upstream from the local power grid, leading to unstable power or local brown outs on select phases, yet may still be delivering the power being demanded. Some utilities charge power quality tariffs to users, in particular, industrial/commercial users, for exceptionally bad loads. Energy storage system 105 could pull power from the good phases and push it onto the weak phase, as noted above for the heavily loaded genset (e.g., using direct phase to phase conversion or a local supercapacitor or other temporary storage). In these embodiments it is noted that the energy storage system 105 and load balancing module 715 can be paired with one or more generators, or installed as a standalone system to balance and correct the local grid supply or local loads.

In some embodiments, energy storage system 105 could be configured to transmit a signal to a transfer switch configured to disconnect one or more phases of a power grid to which a local power grid is connected (e.g., a larger utility grid) in response to the signal. The transfer switch can disconnect a weak phase, and energy storage system 105 can utilize power stored in energy storage device 205 and/or power transferred from other, stronger phases to power the weak phase. In this manner, energy storage system 105 can recreate the weak phase internally on the local power grid to supply power demand that would otherwise not be met by the weak phase when connected to the utility grid. Longer term storage could also be used to charge local UPS-style battery storage from a utility grid seeing an off balanced local load, balancing the load seen by the utility grid and charging the battery/storage from the weakly loaded phase so that the charging of the battery is not seen by local users. This local inverter/battery could also then be used as above to provide local peak shaving, spinning reserve, surge supply, fill in, or individual phase high load balancing/phase fill in. Power factor correction, harmonic correction, and other active filtering power conditioning could also be provided.

In situations where electric vehicles or plug-in hybrids, or buses, or a fleet of local removable batteries need to be charged (such as for electric forklifts, or electric delivery vehicles) or large local storage is charged for peak shaving/grid fill in, energy storage system 105 could be used to balance the load on the grid. In some embodiments, energy storage system 105 could charge the batteries/storage by only loading the relatively unloaded phases or by "filling in" the loads on each phase to a selected nominal average or maximum load level. In this manner, the local load is managed so the local system is not stressed charging the associated batteries/storage units, and the local loads and users do not experience power sag or phase brown outs. At the same time, a well-balanced load is presented to the utility connection, avoiding power quality tariffs. In effect, a virtual "off-peak" charging system is created that utilizes the power pulled from filling in the load on low utilized phases and yet also dynamically load balances and prevents overload on the local grid. In some embodiments, this large bank of removable battery/storage and vehicle batteries can also be used to provide peak shaving, load surge (such as for large motor start up or aluminum smelting start up), or to sell grid fill in back to the utility as needed. A user set minimum charge level or minimum set of full charged units could be set to allow for continued local use for the main battery purpose (such as fork lift usage or fleet vehicles). If vehicles are hybrids, such as, but not limited to, hybrid cars, buses, or delivery or other utility vehicles, they could potentially be used to provide a power source for fill in, or emergency standby power generation for the plant/residence either by manual starting or starting under automatic control of the energy storage system 105.

Figure 8:
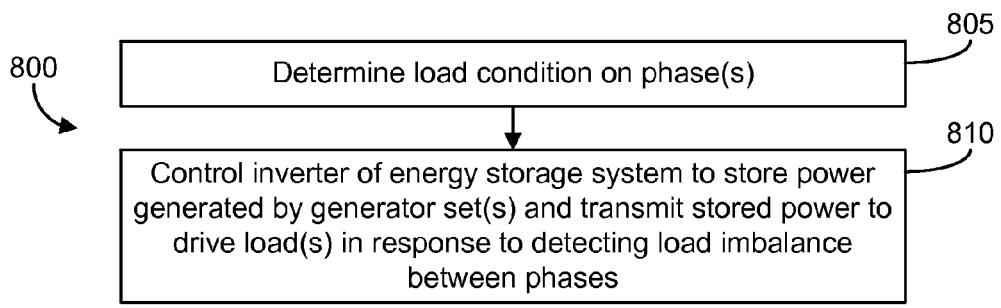
FIG. 8 is a flow diagram of a process for controlling an energy storage system to balance load across multiple phases according to an exemplary embodiment.

FIG. 8 illustrates a flow diagram of a process 800 for balancing a load across multiple phases using an energy storage system. Referring now to both FIGS. 7 and 8, energy storage system 105 determines a load condition on one or more phases over which generator set(s) 110 provide power to drive load(s) 130. One or more phases may be in a high load condition (e.g., have a load higher than a threshold level, or at least a threshold level above a load level of one or more other phases) or a low load condition (e.g., have a load lower than a threshold level, or at least a threshold level below one or more other phases) with respect to other phases. In some embodiments, energy storage system 105 may determine a load condition using a current, voltage, and/or other information associated with a phase. The load condition information is used to detect an imbalance of one or more of the phases.

Energy storage system 105 controls inverter 240 to store power generated by generator set(s) 110 in energy storage device 205 and/or transmit power stored in energy storage device 205 to help drive load(s) 130 on one or more phases in response to detecting a load imbalance. Load balancing module 715 may detect that a particular phase is in a low load condition, and excess power generated on the phase by generator set(s) 110 may be stored in energy storage device 205 to load the phase and balance the phase with the other phases. Load balancing module 715 may detect that a particular phase is in a high load condition, and energy storage system 105 may transmit power from energy storage device 205 to supplement power supplied by generator set(s) 110 on the phase to drive the load(s) 130 on the phase.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An energy storage system comprising:
an energy storage device;
a bidirectional inverter configured to control a flow of power into or out of the energy storage device via a plurality of phases; and
a controller configured to control the bidirectional inverter based on a load condition on one or more of the plurality of phases, wherein the controller is configured to control the bidirectional inverter to store power generated by a generator set in the energy storage device and transmit power from the energy storage device to a load driven by the generator set in response to detecting a load imbalance between the plurality of phases, and wherein the controller is further configured to:
detect the load imbalance upstream of a local power grid on a first phase of the plurality of phases;
transmit a signal to a transfer switch configured to disconnect the first phase of the local power grid from a power grid upstream of the local power grid in response to receiving the signal while maintaining connections of at least one other phase of the plurality of phases; and
provide power on the first phase using power from the energy storage device or one or more second phases of the plurality of phases.

2. The energy storage system of claim 1, wherein the bidirectional inverter is configured to independently control the flow of power into or out of the energy storage device for each of the plurality of phases.

3. The energy storage system of claim 2, wherein the bidirectional inverter comprises separate single-phase inverter for each of the plurality of phases.

4. The energy storage system of claim 3, further comprising a second energy storage device coupled to each single-phase inverter and configured to temporarily store power received from one or more first phases having a lower applied load than an applied load of one or more second phases before the power is transmitted to the load via the one or more second phases, wherein the second energy storage device comprises at least one of a battery or a supercapacitor.

5. The energy storage system of claim 1, wherein the controller is configured to:
detect a first phase of the plurality of phases having a different load than one or more second phases of the plurality of phases; and
control an operational state of the bidirectional inverter to store power in or transmit power from the energy storage device via the first phase in response to detecting the different load on the first phase.

6. The energy storage system of claim 5, wherein the controller is configured to:
detect a lower load on the first phase than on the one or more second phases; and
control the bidirectional inverter to charge the energy storage device with power generated by the generator set in response to detecting the lower load on the first phase.

7. The energy storage system of claim 5, wherein the controller is configured to:
detect a higher load on the first phase than on the one or more second phases; and control the bidirectional inverter discharge power from the energy storage device to drive the load on the first phase in response to detecting the higher load on the first phase.

8. The energy storage system of claim 1, wherein the controller is configured to:
receive a plurality of current signals from one or more current sensors, wherein each of the plurality of current signals indicates a current flow on one of the plurality of phases; and
monitor the load condition and detect the load imbalance using the current signals.

9. The energy storage system of claim 1, wherein the controller is configured to:
monitor a voltage for each of the plurality of phases; and
monitor the load condition and detect the load imbalance using the voltages for the plurality of phases.

10. The energy storage system of claim 1, wherein the controller is configured to:
determine a characteristic of the generator set; and
control the bidirectional inverter to store power generated by the generator set in the energy storage device and transmit power from the energy storage device to the load based on the characteristic of the generator set and the load condition and prevent a first phase of the plurality of phases from overloading.

11. The energy storage system of claim 1, wherein the generator set comprises a first generator set of a plurality of generator sets configured to drive a plurality of loads, and wherein the controller is configured to control the bidirectional inverter to store power generated by the generator sets in the energy storage device and transmit power from the energy storage device to the loads in response to detecting a load imbalance between the plurality of phases.

12. The energy storage system of claim 11, wherein the controller is configured to control the bidirectional inverter to balance the load on the plurality of phases while the generator sets are charging at least one of one or more electric vehicles, one or more plug-in hybrid vehicles, or a plurality of removable batteries.

13. A method of controlling a flow of power to and from an energy storage system, the method comprising:
determining, at a controller of the energy storage system, a load condition on one or more of a plurality of phases of a local alternating current (AC) grid; and
controlling a bidirectional inverter of the energy storage system to store power from the local AC grid in an energy storage device of the energy storage system and transmit power from the energy storage device to a load driven by the local AC grid in response to detecting a load imbalance between the plurality of phases;
transmitting a signal to a transfer switch configured to disconnect a first phase of the local AC grid from a utility grid upstream of the local AC grid in response to receiving the signal while maintaining connections of at least one other phase of the plurality of phases; and
providing power on the first phase using power from the energy storage device or one or more second phases of the plurality of phases.

14. The method of claim 13, further comprising independently controlling the flow of power into or out of the energy storage device for each of the plurality of phases using the bidirectional inverter.

15. The method of claim 13, further comprising:
detecting a first phase of the plurality of phases having a different load than one or more second phases of the plurality of phases; and
controlling an operational state of the bidirectional inverter to store power in or transmit power from the energy storage device via the first phase in response to detecting the different load on the first phase.

16. The method of claim 15, wherein:
detecting a lower load on the first phase than on the one or more second phases; and
controlling the bidirectional inverter to charge the energy storage device with power from the first phase in response to detecting the lower load on the first phase.

17. The method of claim 15, wherein:
detecting a higher load on the first phase than on the one or more second phases; and
controlling the bidirectional inverter discharge power from the energy storage device to drive the load on the first phase in response to detecting the higher load on the first phase.

18. The method of claim 13, further comprising:
controlling the bidirectional inverter to balance the load on the plurality of phases by increasing the load on one or more first phases of the plurality of phases in response to detecting the one or more first phases have a lower load than one or more second phases of the plurality of phases; and
charging at least one of one or more electric vehicles, one or more plug-in hybrid vehicles, or a plurality of removable batteries with the power scavenged by the bidirectional inverter by balancing the load on the plurality of phases.

19. The method of claim 13, further comprising:
storing power in the energy storage device coupled to the bidirectional inverter from one or more first phases having a lower applied load than one or more second phases; and
transmitting power from the energy storage device to the one or more second phases; wherein the energy storage device comprises at least one of a battery or a supercapacitor.

20. The method of claim 13, further comprising:
determining a characteristic of the generator set; and
controlling the bidirectional inverter to store power generated by the generator set in the energy storage device and transmit power from the energy storage device to the load based on the characteristic of the generator set and the load condition and prevent a first phase of the plurality of phases from overloading.

21. A hybrid generator system comprising:
a generator set configured to generate power to drive a load; and
an energy storage system comprising:
an energy storage device;
a bidirectional inverter configured to control a flow of power into or out of the energy storage device via a plurality of phases; and
a controller configured to control the bidirectional inverter based on a load condition on one or more of the plurality of phases, wherein the controller is configured to control the bidirectional inverter to store power generated by the generator set in the energy storage device and transmit power from the energy storage device to the load in response to detecting a load imbalance between the plurality of phases, and wherein controller is further configured to:
detect the load imbalance upstream of a local power grid on a first phase of the plurality of phases;
transmit a signal to a transfer switch configured to disconnect the first phase of the local power grid from a power grid upstream of the local power grid in response to receiving the signal while maintaining connections of at least one other phase of the plurality of phases; and
provide power on the first phase using power from the energy storage device or one or more second phases of the plurality of phases.

22. The hybrid generator system of claim 21, wherein the bidirectional inverter is configured to independently control the flow of power into or out of the energy storage device for each of the plurality of phases.

23. The hybrid generator system of claim 21, wherein the controller is configured to:
detect the first phase of the plurality of phases having a different load than one or more second phases of the plurality of phases; and
control an operational state of the bidirectional inverter to store power in or transmit power from the energy storage device via the first phase in response to detecting the different load on the first phase.

24. The hybrid generator system of claim 23, wherein the controller is configured to:
detect a lower load on the first phase than on the one or more second phases; and
control the bidirectional inverter to charge the energy storage device with power generated by the generator set in response to detecting the lower load on the first phase.

25. The hybrid generator system of claim 23, wherein the controller is configured to:
detect a higher load on the first phase than on the one or more second phases; and
control the bidirectional inverter discharge power from the energy storage device to drive the load on the first phase in response to detecting the higher load on the first phase.

26. The hybrid generator system of claim 21, wherein the controller is configured to:
determine a characteristic of the generator set; and
control the bidirectional inverter to store power generated by the generator set in the energy storage device and transmit power from the energy storage device to the load based on the characteristic of the generator set and the load condition and prevent a first phase of the plurality of phases from overloading.

* * * * *